(12) United States Patent
Smith

(10) Patent No.: US 12,502,922 B2
(45) Date of Patent: Dec. 23, 2025

(54) MULTI-PIECE SPRING PERCH

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 392 days.

(21) Appl. No.: 18/365,438

(22) Filed: Aug. 4, 2023

(65) Prior Publication Data

US 2024/0227482 A1 Jul. 11, 2024

Related U.S. Application Data

(63) Continuation-in-part of application No. 18/300,648, filed on Apr. 14, 2023, now Pat. No. 11,807,059, which is a continuation-in-part of application No. 29/848,890, filed on Aug. 5, 2022, now Pat. No. Des. 1,032,424.

(60) Provisional application No. 63/487,914, filed on Mar. 2, 2023, provisional application No. 63/478,784, filed on Jan. 6, 2023.

(51) Int. Cl.
*B60G 15/06* (2006.01)

(52) U.S. Cl.
CPC ...... *B60G 15/063* (2013.01); *B60G 2202/312* (2013.01); *B60G 2204/1242* (2013.01); *B60G 2204/43* (2013.01); *B60G 2206/8207* (2013.01)

(58) Field of Classification Search
CPC ............ B60G 15/063; B60G 2202/312; B60G 2204/1242; B60G 2204/43; B60G 2206/8207
USPC ....................................... 188/322.19, 321.21
See application file for complete search history.

(56) References Cited

U.S. PATENT DOCUMENTS

| | | | |
|---|---|---|---|
| 6,029,958 A | 2/2000 | Larsson et al. | |
| 10,570,976 B1* | 2/2020 | Evans | F16F 1/13 |
| 11,577,570 B2* | 2/2023 | Smith | B60G 15/063 |
| 11,618,296 B2 | 4/2023 | Smith | |
| 11,807,059 B1 | 11/2023 | Smith | |
| 2005/0109570 A1 | 5/2005 | Muller et al. | |
| 2007/0007092 A1 | 1/2007 | Fritz et al. | |
| 2022/0281278 A1 | 9/2022 | Boulay et al. | |
| 2024/0116322 A1* | 4/2024 | Carr | B60G 17/021 |

FOREIGN PATENT DOCUMENTS

CN 202326895 7/2012

* cited by examiner

*Primary Examiner* — Christopher P Schwartz
(74) *Attorney, Agent, or Firm* — Schmeiser, Olsen & Watts LLP

(57) ABSTRACT

A multi-piece spring perch for a coilover shock is disclosed including a pair of half members. The coilover shock includes a rod, a coil spring mounted about the rod and a U-shaped member secured to a lower end of the rod. The multi-piece spring perch is mounted about the rod and the U-shaped member to receive an end of the coil spring, strengthening the connection between the rod and the U-shaped member.

20 Claims, 6 Drawing Sheets

MULTI-PIECE SPRING PERCH

CROSS REFERENCE TO RELATED APPLICATION(S)

This application claims priority to U.S. Provisional patent application entitled "MULTI-PIECE SPRING PERCH," Ser. No. 63/487,914, filed Mar. 2, 2023, and is a continuation-in-part of U.S. patent application entitled "SHOCK END LOOP," Ser. No. 18/300,648, filed Apr. 14, 2023, which is a continuation-in-part of U.S. Design patent application entitled "SHOCK END LOOP," Ser. No. 29/848,890, filed Aug. 5, 2022, and claims priority to U.S. Provisional patent application entitled "SHOCK END LOOP," Ser. No. 63/478,784, filed Jan. 6, 2023, the disclosures of which are hereby incorporated entirely herein by reference.

BACKGROUND OF THE INVENTION

Technical Field

This invention relates generally to a multi-piece spring perch and particularly to a multi-piece spring perch for strengthening a coilover shock.

State of the Art

The primary purpose of a spring perch is to hold the coil spring of a coilover shock on the shaft of the shock. Generally, the spring perch is one piece and has a slot in the side of the spring perch to allow for sliding it over the shock shaft and set it onto the lower shaft loop. The conventional one piece spring perch does not strengthen any part of the coilover shock. The one piece spring perch merely gives the coil spring a place to sit on the shaft of the shock.

Generally, with coilover shocks there is a weakness in the connection between the lower portion of the shaft threadingly connected to the loop. This constitutes a weak point when the coilover shock assembly undergoes lateral forces which may cause shearing between the lower portion of the shaft and the loop. This is not an issue when the loads on this area are in tension or compression. However, when there are lateral or side loads, the threads can be sheared off the shaft, thus disengaging the shaft from the loop.

Accordingly, what is needed is an improved spring perch design to strengthen the mounting of the coil spring on the shaft of the shock.

SUMMARY OF THE INVENTION

The present invention relates generally to a multi-piece spring perch and particularly to a multi-piece spring perch for strengthening a coilover shock.

Embodiments comprise a spring perch for a coilover shock comprising a pair of half members, each of the pair of half members having a pair of apertures for receiving at least one bolt therebetween, wherein each of the pair of half members is provided with a longitudinally extending half bore for receiving a rod of the coilover shock; and a U-shaped member is secured to a lower end of the rod, wherein the U-shaped member is provided with a step portion, wherein at least one of the pair of half members provided with a recess on a bottom surface, and wherein the recess receives the step portion of the U-shaped member. The spring perch may further comprise a circumferential flange provided about a top surface of each of the pair of half members. The circumferential flange may surround a recessed portion provided on the top surface of each of the pair of half members. The top surface may surround the circumferential flange of each of the pair of half members. The pair of half members may be fitted together about the rod and on a top portion of the U-shaped member. The at least one bolt may be an Allen bolt. The at least one bolt may extend transversely between the pair of half members. The pair of half members may be provided with a pair of bolts. The pair of bolts may extend transversely relative to the half bore of each of the pair of half members.

Embodiments comprise a coilover shock comprising a rod; a coil spring mounted about the rod; a U-shaped member secured to a lower end of the rod; and a spring perch mounted about the rod and the U-shaped member to receive an end of the coil spring, wherein the spring perch comprises a pair of half members, each of the pair of half members having a pair of apertures for receiving at least one bolt therebetween, wherein each of the pair of half members is provided with a longitudinally extending half bore for receiving the rod of the coilover shock, wherein the U-shaped member is provided with a step portion, wherein at least one of the pair of half members provided with a recess on a bottom surface, and wherein the recess receives the step portion of the U-shaped member. A circumferential flange may be provided about a top surface of each of the pair of half members. The circumferential flange may surround a recessed portion provided on the top surface of each of the pair of half members. The top surface may surround the circumferential flange of each of the pair of half members. The pair of half members may be fitted together about the rod and on a top portion of the U-shaped member.

Embodiments comprise a method of strengthening a coilover shock comprising providing a spring perch mounted about a connection between a rod and a U-shaped member of the coilover shock; and securing a coil spring about the rod and the U-shaped member with the spring perch, wherein the spring perch comprises a pair of half members, each of the pair of half members having a pair of apertures for receiving at least one bolt therebetween, wherein each of the pair of half members is provided with a longitudinally extending half bore for receiving the rod of the coilover shock, wherein the U-shaped member is provided with a step portion, wherein at least one of the pair of half members provided with a recess on a bottom surface, wherein the recess receives the step portion of the U-shaped member, and wherein the connection between the rod and the U-shaped member is strengthened. A circumferential flange may be provided about a top surface of each of the pair of half members. The circumferential flange may surround a recessed portion provided on the top surface of each of the pair of half members. The top surface may surround the circumferential flange of each of the pair of half members. The pair of half members may be fitted together about the rod and on a top portion of the U-shaped member. The at least one bolt may extend transversely between the pair of half members.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate generally to a multi-piece spring perch and particularly to a coilover shock having a multi-piece spring perch.

The disclosed spring perch strengthens the mounting of a lower portion of the coil spring on the shaft of a coilover shock at the loop attachment point by locking the coil spring and the shaft together preventing the threads of the shaft from sheering off when the shaft of the shock and the coil spring undergo a side load.

The disclosed spring perch is a multi-piece spring perch which captures the shaft and the loop together at the critical juncture of the shaft and loop connection and prevents them from sheering apart from each other when there are lateral or side loads placed on the joint or connection point.

Figure 1:
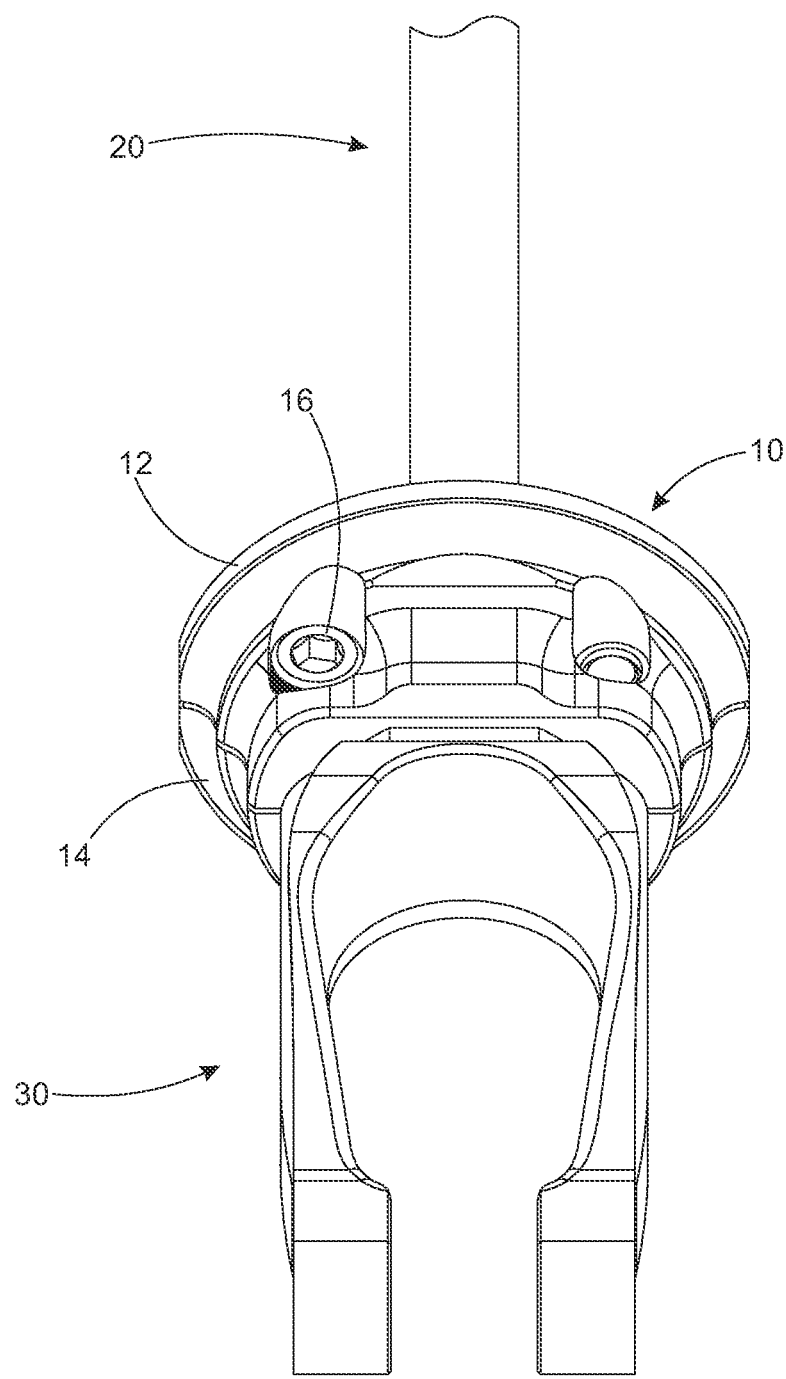
FIG. 1 is a perspective view of a spring perch from below in accordance with an embodiment.
Figure 2:
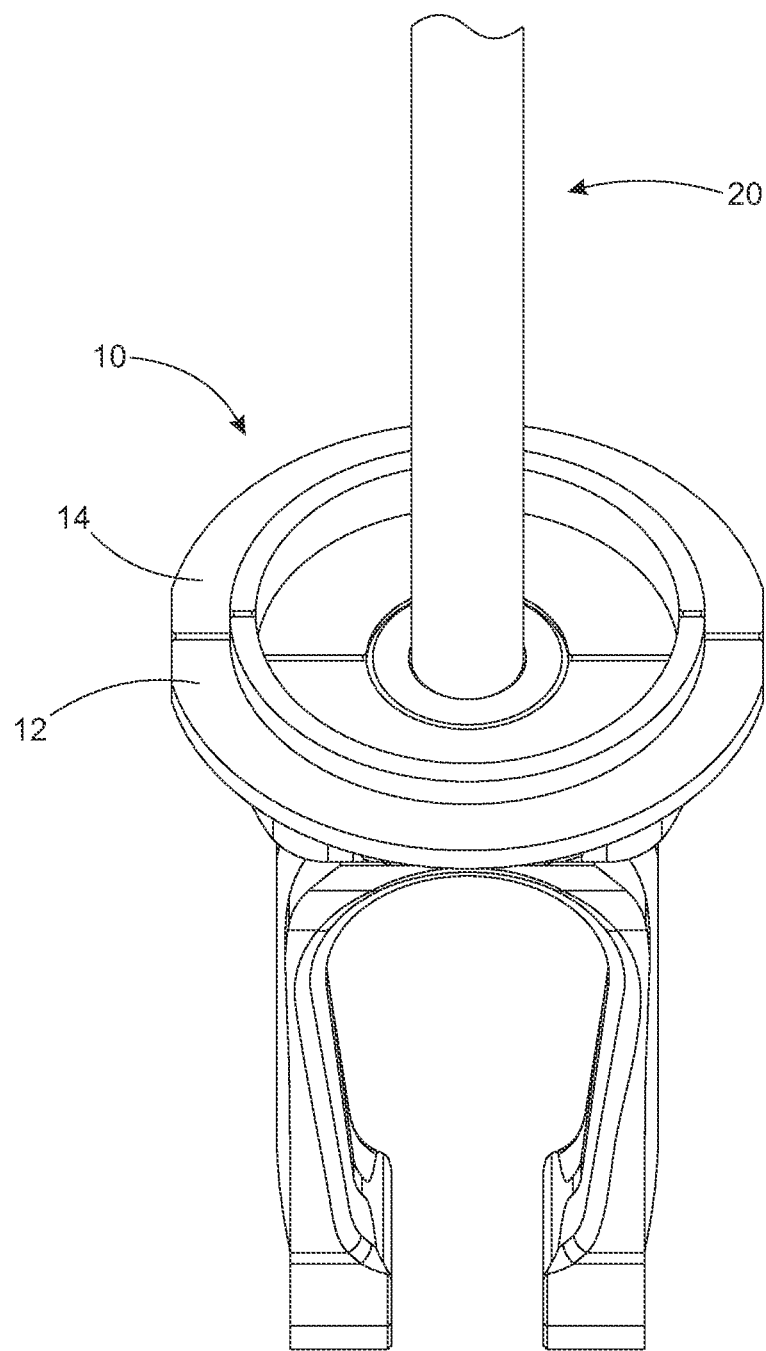
FIG. 2 is a perspective view of a spring perch from above in accordance with an embodiment.
Figure 3:
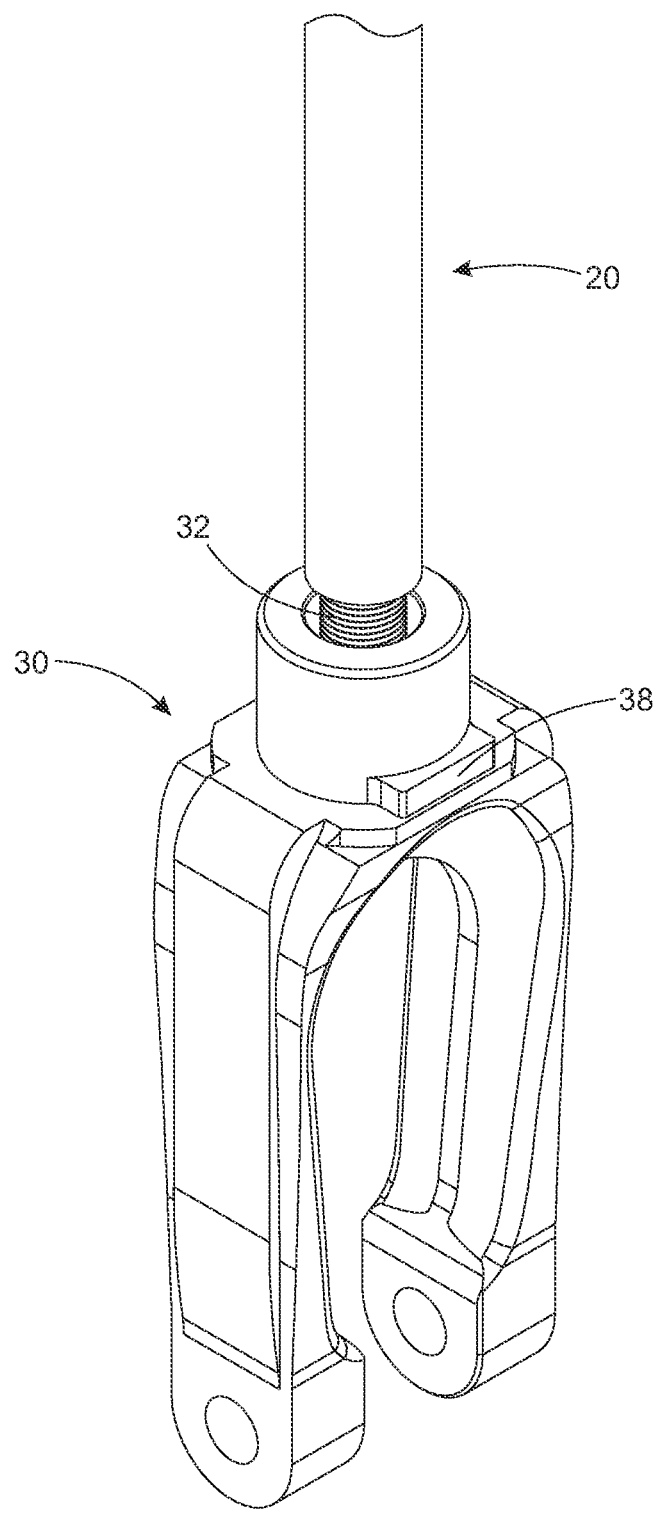
FIG. 3 is a perspective view of a lower portion of a rod of a shock showing threads in accordance with an embodiment.

Referring to the drawings, as shown in FIGS. 1-6, embodiments of a spring perch for coilover shocks comprise a spring perch 10 fully assembled on a rod (or shaft) 20 of a shock (not shown). Spring perch 10 comprises two identical or similar half members 12 and 14 assembled together and secured by a pair of bolts (one being shown as 16), such as Allen bolts. A U-shaped member (or loop) 30 is assembled with rod 20, as shown in FIG. 1. FIG. 2 shows a perspective top view of spring perch 10 comprising two identical or similar half members 12 and 14 in their assembled position around rod 20. FIG. 3 shows rod 20 threadingly engaged with threads 32 of U-shaped member 30 in their preassembled state.

Figure 4:
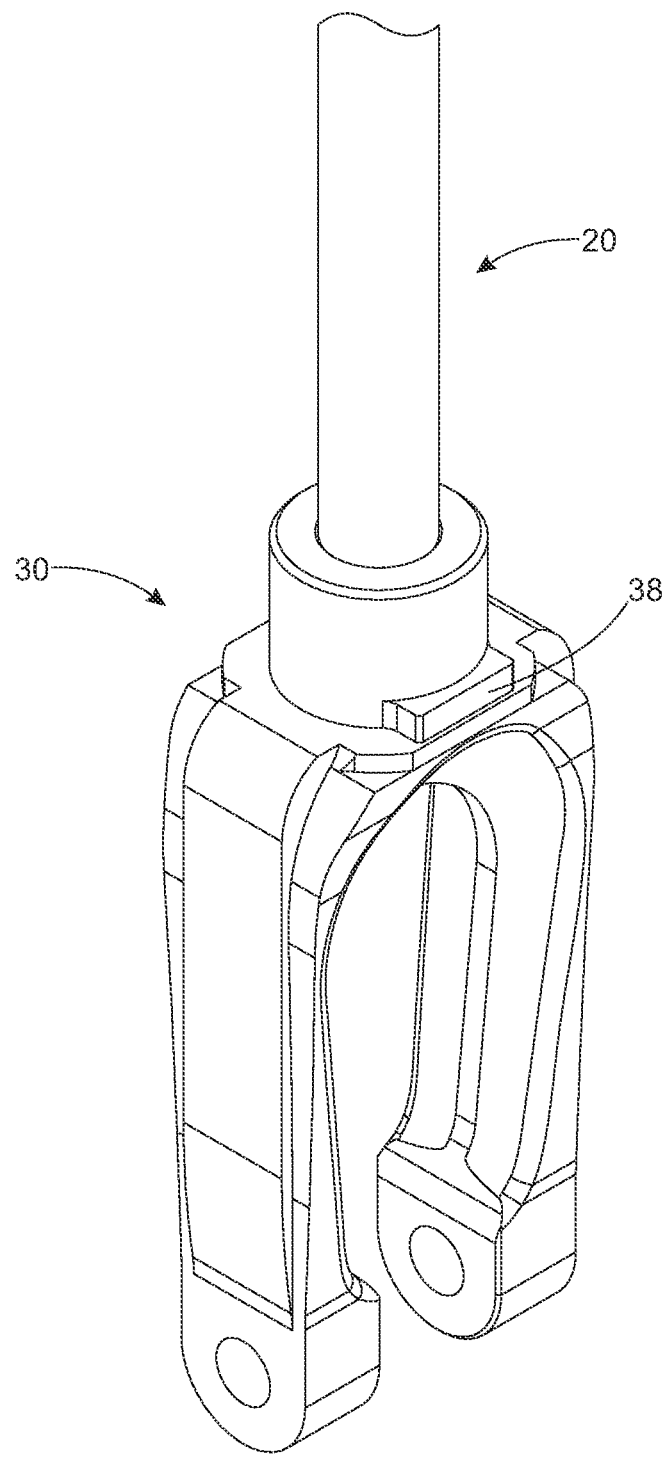
FIG. 4 is a perspective view of a lower portion of a rod of a shock fully engaged in accordance with an embodiment.
Figure 5:
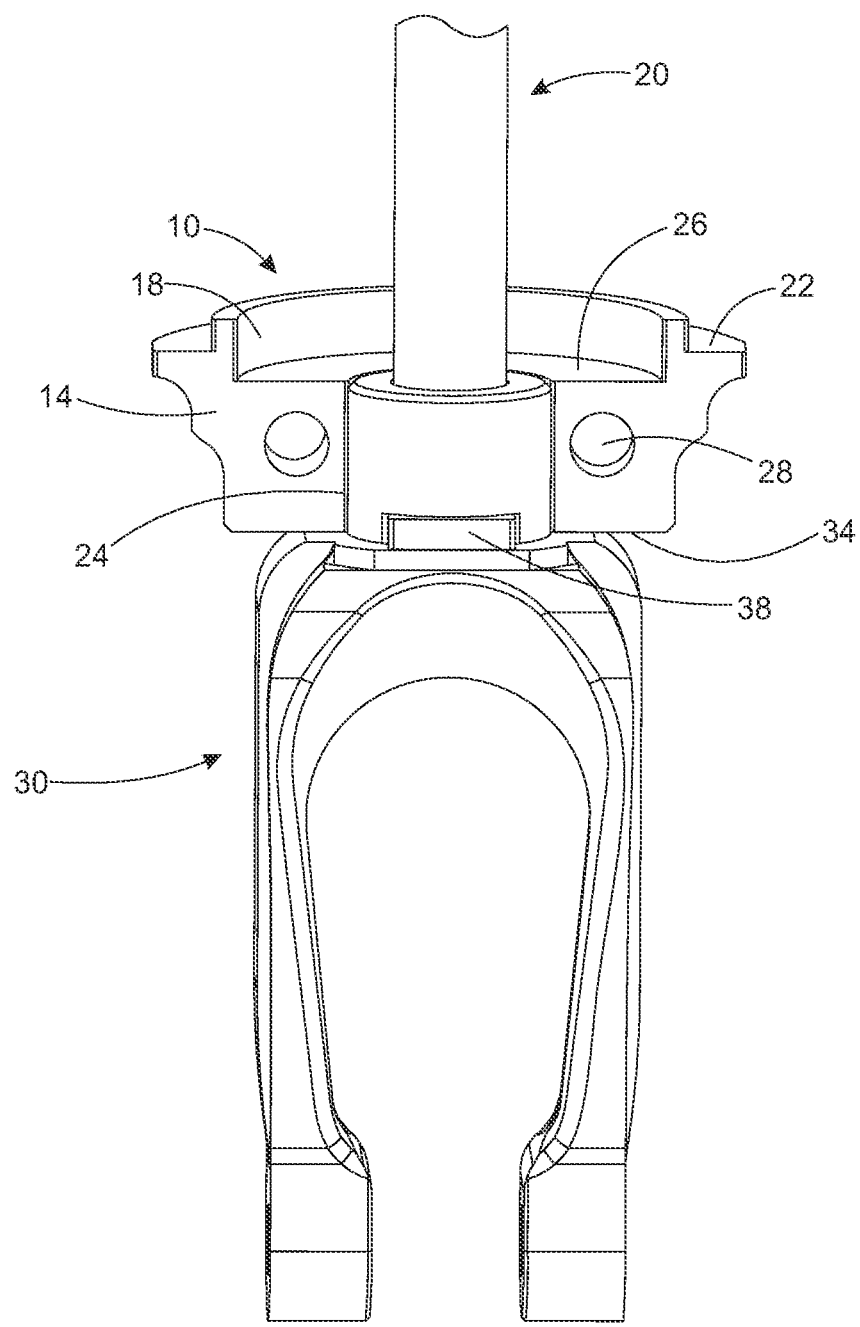
FIG. 5 is a perspective view of a lower portion of a shock receiving one half of a spring perch in accordance with an embodiment.
Figure 6:
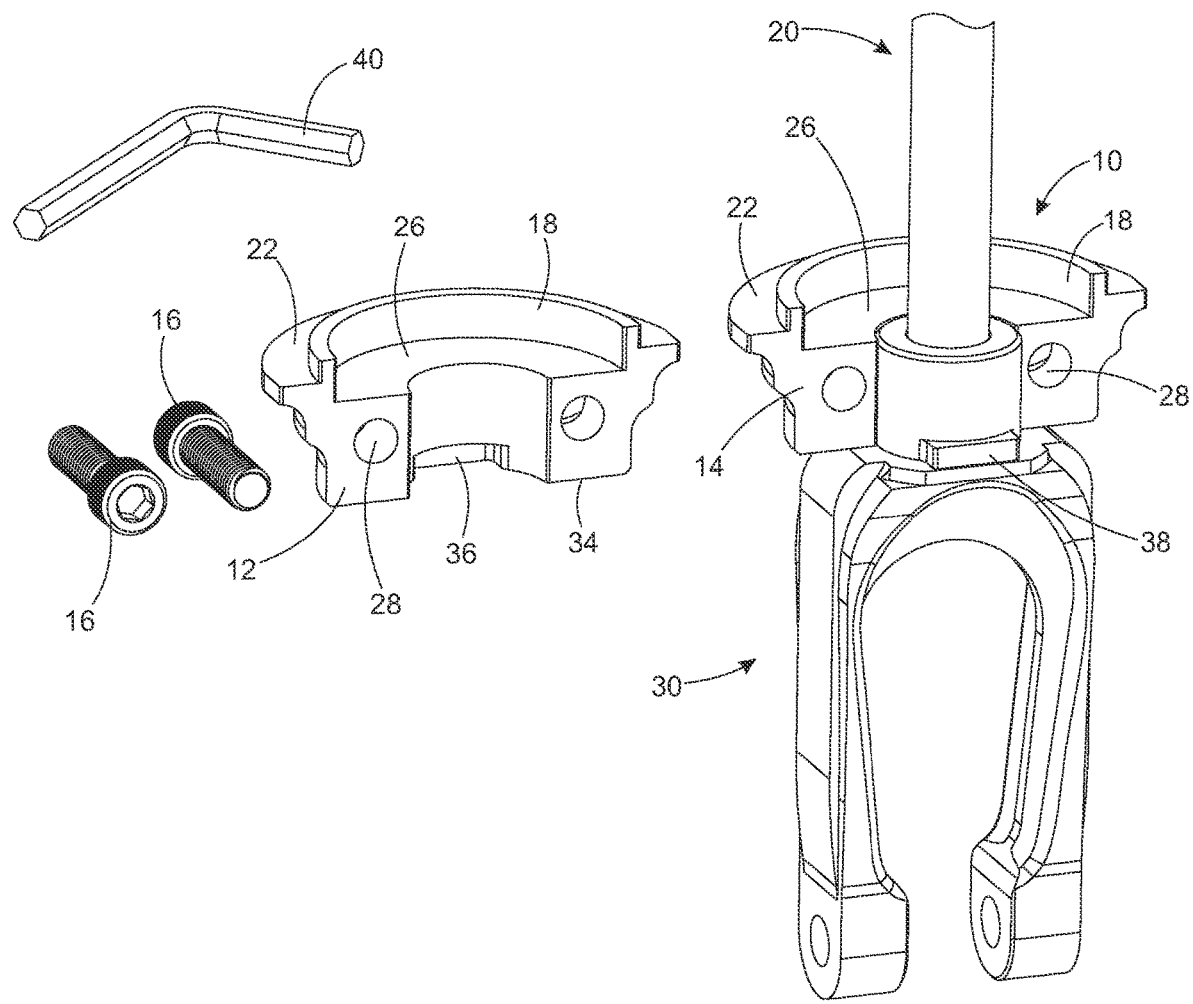
FIG. 6 is a plane view of a lower portion of a rod of a shock with one of half a spring perch engaged and one half disengaged in accordance with an embodiment.

FIG. 4 shows rod 20 fully engaged with U-shaped member 30. FIG. 5 shows one half member 14 of spring perch 10 mounted about rod 20 and received on U-shaped member 30. FIGS. 5 and 6 further show half members 12, 14 each provided with a circumferential flange 18 extending about a top surface 22. A longitudinally extending half bore 24 extends through a center of each half member 12, 14 so as to receive the rod 20 therewithin. Flange 18 further surrounds a top recess 26 that extends between flange 18 and longitudinally extending half bore 24. Each of the half members 12, 14 is provided with a pair of transverse apertures 28 for receiving at least one bolt 16. Both of the half members 12, 14 are provided with a bottom surface 34. Half member 12 and/or half member 14 is provided with a recess portion 36 (as shown in FIG. 6) which receives a step portion 38 of U-shaped member 30. The recess portion 36 receiving and engaged with the step portion 38 of U-shaped member 30 operates to inhibit rotation of the spring perch 10 when coupled about rod 20. Otherwise, the half member 12 (as shown in FIG. 6) is provided with the same structural features as shown with the half member 14.

FIG. 6 shows both half members 12 and 14 of spring perch 10 where half member 14 is mounted on rod 20 and received on U-shaped member 30. Half member 12 is shown in its pre-assembled state and bolts 16 are shown in their preassembled state. A wrench 40, such as an Allen wrench, is also shown.

A method of strengthening the mounting coilover shock is also disclosed. A spring perch is mounted about a connection between a rod and a U-shaped member of the coilover shock. A coil spring is secured about the rod and the U-shaped member with the spring perch, wherein the spring perch comprises a pair of half members, each of the half members having a pair of apertures for receiving at least one bolt therebetween, wherein each of the half members is provided with a longitudinally extending half bore for receiving the rod of the coilover shock, wherein the connection between the rod and the U-shaped member is strengthened.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A spring perch for a coilover shock comprising:
a pair of half members, each of the pair of half members having a pair of apertures for receiving at least one bolt therebetween, wherein each of the pair of half members is provided with a longitudinally extending half bore for receiving a rod of the coilover shock; and
a U-shaped member is secured to a lower end of the rod, wherein the U-shaped member is provided with a step portion, wherein at least one of the pair of half members provided with a recess on a bottom surface, and wherein the recess receives the step portion of the U-shaped member.

2. The spring perch of claim 1, further comprising a circumferential flange provided about a top surface of each of the pair of half members.

3. The spring perch of claim 2, wherein the circumferential flange surrounds a recessed portion provided on the top surface of each of the pair of half members.

4. The spring perch of claim 3, wherein the top surface surrounds the circumferential flange of each of the pair of half members.

5. The spring perch of claim 1, wherein the pair of half members are fitted together about the rod and on a top portion of the U-shaped member.

6. The spring perch of claim 1, wherein the at least one bolt is an Allen bolt.

7. The spring perch of claim 1, wherein the at least one bolt extends transversely between the pair of half members.

8. The spring perch of claim 1, wherein the pair of half members are provided with a pair of bolts.

9. The spring perch of claim 8, wherein the pair of bolts extend transversely relative to the half bore of each of the pair of half members.

10. A coilover shock comprising:
a rod;
a coil spring mounted about the rod;
a U-shaped member secured to a lower end of the rod; and
a spring perch mounted about the rod and the U-shaped member to receive an end of the coil spring, wherein the spring perch comprises a pair of half members, each of the pair of half members having a pair of apertures for receiving at least one bolt therebetween, wherein each of the pair of half members is provided with a longitudinally extending half bore for receiving the rod of the coilover shock, wherein the U-shaped member is provided with a step portion, wherein at least one of the pair of half members provided with a recess on a bottom surface, and wherein the recess receives the step portion of the U-shaped member.

11. The coilover shock of claim 10, further comprising a circumferential flange provided about a top surface of each of the pair of half members.

12. The coilover shock of claim 11, wherein the circumferential flange surrounds a recessed portion provided on the top surface of each of the pair of half members.

13. The coilover shock of claim 12, wherein the top surface surrounds the circumferential flange of each of the pair of half members.

14. The coilover shock of claim 10, wherein the pair of half members are fitted together about the rod and on a top portion of the U-shaped member.

15. A method of using a spring perch for strengthening a coilover shock comprising:
providing a spring perch mounted about a connection between a rod and a U-shaped member of the coilover shock; and
securing a coil spring about the rod and the U-shaped member with the spring perch, wherein the spring perch comprises a pair of half members, each of the pair of half members having a pair of apertures for receiving at least one bolt therebetween, wherein each of the pair of half members is provided with a longitudinally extending half bore for receiving the rod of the coilover shock, wherein the U-shaped member is provided with a step portion, wherein at least one of the pair of half members provided with a recess on a bottom surface, wherein the recess receives the step portion of the U-shaped member, and wherein the connection between the rod and the U-shaped member is strengthened.

16. The method of claim 15, further comprising a circumferential flange provided about a top surface of each of the pair of half members.

17. The method of claim 16, wherein the circumferential flange surrounds a recessed portion provided on the top surface of each of the pair of half members.

18. The method of claim 17, wherein the top surface surrounds the circumferential flange of each of the pair of half members.

19. The method of claim 15, wherein the pair of half members are fitted together about the rod and on a top portion of the U-shaped member.

20. The method of claim 15, wherein the at least one bolt extends transversely between the pair of half members.

* * * * *